US012753597B1

(12) United States Patent
Sakow et al.

(10) Patent No.: US 12,753,597 B1
(45) Date of Patent: Oct. 6, 2026

(54) WATER FLOW SHUTOFF SYSTEM

(71) Applicant: Liquified Solutions, LLC, Clearwater, FL (US)

(72) Inventors: Todd Sakow, St. Petersburg, FL (US); Timothy Sakow, St. Petersburg, FL (US); Matthew Stepanik, Palm Harbor, FL (US); Jeremy Nashed, Tierra Verde, FL (US)

(73) Assignee: Liquified Solutions, LLC, Clearwater, FL (US)

( * ) Notice: Subject to any disclaimer, the term of this patent is extended or adjusted under 35 U.S.C. 154(b) by 0 days.

(21) Appl. No.: 19/035,326

(22) Filed: Jan. 23, 2025

(51) Int. Cl.
*E03D 1/32* (2006.01)
*F16K 24/04* (2006.01)

(52) U.S. Cl.
CPC .............. *E03D 1/32* (2013.01); *F16K 24/048* (2013.01); *Y10T 137/7475* (2015.04)

(58) Field of Classification Search
CPC .... E03D 1/32; E03D 1/33; E03D 1/36; F16K 24/048; F16K 31/24; F16K 31/26; F16K 31/265; F16K 31/28; Y10T 137/7358; Y10T 137/7439; Y10T 137/7475; Y10T 137/053; Y10T 137/6004; Y10T 137/6096
USPC .... 4/227.7, 227.6, 227.4, 227.2, 227.1, 415; 137/315.08, 315.17, 395–454
See application file for complete search history.

(56) References Cited

U.S. PATENT DOCUMENTS 1,225,278 A 5/1917 Schulte
5,211,204 A * 5/1993 Mikol .................... E03D 1/144 137/410
7,571,740 B2 8/2009 Kaneko et al.
7,661,438 B2 2/2010 Nichols-Roy et al.
7,789,066 B2 * 9/2010 Torii ................ F02M 35/10255 123/336
8,387,652 B2 3/2013 Guthrie
8,650,672 B2 2/2014 Liu
(Continued)

FOREIGN PATENT DOCUMENTS

CN 2315158 U 4/1999
CN 2546522 U 4/2003
(Continued)

OTHER PUBLICATIONS

Product: 400LS—Universal Fill Valve, Leak Sentry Website URL: https://www.fluidmaster.com/products/toilet/toilet-fill-valves/400lsr-universal-fill-valve-leak-sentry/ Date Last Accessed: Thursday, Mar. 13, 2025.

*Primary Examiner* — Craig J Price
(74) *Attorney, Agent, or Firm* — Andriy Lytvyn; Stephen E. Kelly; Hill Ward Henderson, P.A.

(57) ABSTRACT

A water flow control system having a vessel disposed within a toilet tank. A float is positioned within the vessel, such that the float is configured to rise and descend based on the water level within the vessel. When the vessel is filled with water, the float is in its raised position, in which the arm connected to the float closes a fill valve. If the water level within the vessel decreases, the float descends into a descended position, causing the arm to open the fill valve. An actuation lever is affixed to the vessel. The proximal end of the actuation lever is connected to the flush handle, and the distal end is biased toward the vessel. When the flush handle is actuated, the distal end of the lever is retracted away from the vessel causing an egress of the water, thereby transitioning the float into its descended position.

25 Claims, 7 Drawing Sheets

(56) References Cited

U.S. PATENT DOCUMENTS

| | | | | |
|---|---|---|---|---|
| 8,707,474 | B2 * | 4/2014 | Rachwal | G01M 3/3245 4/426 |
| 8,720,480 | B2 | 5/2014 | Yamasaki et al. | |
| 9,340,960 | B2 | 5/2016 | Xu | |
| 9,464,420 | B2 | 10/2016 | Magar | |
| 9,499,964 | B2 | 11/2016 | Yamasaki et al. | |
| 9,611,632 | B2 * | 4/2017 | Kim | E03D 1/33 |
| 9,745,729 | B2 | 8/2017 | Yamasaki et al. | |
| 9,890,525 | B2 | 2/2018 | Magar | |
| 10,041,240 | B2 | 8/2018 | Liu et al. | |
| 10,132,067 | B2 | 11/2018 | Liu et al. | |
| 10,233,623 | B2 * | 3/2019 | Huang | E03D 1/33 |
| 10,329,756 | B2 | 6/2019 | Li | |
| 10,480,167 | B2 | 11/2019 | Tanimoto et al. | |
| 10,663,080 | B2 | 5/2020 | Ralph-Smith | |
| 10,774,512 | B2 | 9/2020 | Le | |
| 11,434,631 | B2 | 9/2022 | Le | |
| 11,820,222 | B2 | 11/2023 | Vulkan et al. | |
| 12,123,507 | B2 | 10/2024 | Zhu | |
| 2001/0007158 | A1 | 7/2001 | Hubatka et al. | |
| 2014/0345703 | A1 | 11/2014 | Han | |
| 2016/0097190 | A1 | 4/2016 | Han et al. | |

FOREIGN PATENT DOCUMENTS

| | | | |
|---|---|---|---|
| CN | 1598175 | A | 3/2005 |
| CN | 108166583 | A | 6/2018 |
| CN | 211006926 | U | 7/2020 |
| EP | 2942441 | B1 | 6/2022 |
| GB | 2289696 | B | 10/1997 |
| JP | 3206263 | B2 | 9/2001 |
| RU | 2181454 | C1 | 4/2002 |
| WO | WO 99/20850 | A1 | 4/1999 |
| WO | WO2010100093 | A1 | 9/2010 |

* cited by examiner

WATER FLOW SHUTOFF SYSTEM

BACKGROUND

(1) Field of Endeavor

The present invention relates generally to the field of water flow shutoff systems, and more particularly, to prevention of water damage caused by failure, rupture, or malfunctioning of toilets.

(2) Description of Related Art

Water damage caused by malfunctioning toilets represents a significant and recurring problem in residential, commercial, and industrial settings. One particularly common scenario that contributes to this issue is the catastrophic rupture of toilet tanks. In a traditional float-controlled fill valve, when a rapture occurs and the water leaks out from the toilet tank, the float drops into its descended position, thereby opening the fill valve. The fill valve will then remain in the open state, continuously discharging water until the water supply line is manually shutoff. The discharged water will continuously leak from the raptured tank, likely causing extensive property damage, including the destruction of flooring, drywall, and personal belongings. In many of these cases, such events occur without warning, leaving homeowners or property managers little opportunity to mitigate the damage.

Another common scenario that can cause extensive water waste in a toilet is a leaking or malfunctioning flapper valve. Toilets are traditionally equipped with float-controlled fill valves that regulate the flow of water into the tank following a flush. These valves are designed to close automatically once the tank reaches its preset water level. However, malfunctions in the flapper valve mechanism, such as wear, debris obstruction, seal failure, or flush chain entanglement can prevent the flapper valve from shutting off properly. When this occurs, the water level within the toilet tank will not reach and/or remain at a designated height, which will preclude the float from properly closing the fill valve and/or maintaining it in the closed state. This type of malfunction can lead to significant water waste if the issue is not promptly addressed. Moreover, slow leaks may be difficult to detect and the excessive water waste may go unnoticed for a prolonged duration, resulting in high water bills and a negative environmental impact.

The two scenarios presented above underscore the need for improved mechanisms to prevent and mitigate water damage associated with toilet malfunctions. Despite the widespread use of toilets in modern plumbing systems, current solutions remain inadequate in addressing the risks posed by tank ruptures and continuous inlet valve operation. There is a pressing need for innovative systems and devices that can enhance toilet safety and automatically reduce or prevent water damage and waste from these common failure modes.

SUMMARY

In an embodiment, the invention pertains to a toilet water flow shutoff apparatus. A vessel is configured to be mounted within a toilet tank in a stationary relationship therewith. The toilet tank contains an inflow conduit (standpipe) having a fill valve and an outflow opening, which is sealable by a flapper valve. A float is positioned within the vessel and is configured to translate relative to the vessel between a raised position and a descended position in response to changes in a first water level within the vessel. The float controls the state of the fill valve, such that the fill valve is closed when the float is in the raised position and the fill valve is open when the float is in the descended position.

An actuation lever is pivotally affixed to the vessel. The actuation lever has a first end (proximal end) and a second end (distal end) that are positioned on opposite sides of a fulcrum. The second end of the actuation lever is biased toward the vessel. A first mechanical connector connects the first end of the actuation lever to a toilet flush handle, while a second mechanical connector connects the second end of the actuation lever to the float. In this manner, in addition to raising the flapper valve and causing the toilet tank to flush, actuation of the toilet flush handle is also configured to apply tension onto the first mechanical connector, thereby causing the actuation lever to pivot about the fulcrum. When the lever pivots about the fulcrum, the second end of the actuation lever applies tension onto the second mechanical connector, thereby pulling the float into the descended position. This opens the fill valve to refill the toilet tank.

The float is configured to return into the raised position when the vessel becomes refilled with water. When the float transitions into the raised position, the fill valve closes. The float is configured to remain in the raised position irrespective of the water level within the toilet tank. The buoyancy force of the water contained within the vessel retains the float in a raised position until the toilet flush handle is manually actuated, thus preventing a continuous leak between flushes.

In an embodiment, the second mechanical connector connecting the second end of the actuation lever to the float is a spring. In the descended position, the float abuts a bottom of the vessel, which causes the spring to stretch beyond its default length. In this manner, the spring biases the second end of the actuation lever toward the vessel.

The toilet water flow shutoff apparatus may further include an auxiliary water shutoff mechanism. This mechanism is installed in a fluid communication with the inflow conduit within the toilet tank. The auxiliary water shutoff mechanism directs water from the inflow conduit into the vessel thereby creating a secondary water flow that is configured to fill the vessel within a predetermined duration. Thus, the auxiliary water shutoff mechanism precludes the fill valve from remaining open for longer than the predetermined duration required for the secondary water flow to fill the vessel.

The auxiliary water shutoff mechanism may be adjustable to control a flow rate of the secondary water flow. The flow rate of the secondary water flow may be controlled by an adjustable stem valve. The auxiliary water shutoff mechanism may include a funnel for directing the secondary water flow into the vessel. The funnel may be positioned over the vessel, such that the secondary water flow is directed from the funnel into the vessel by gravity. The opening of the funnel may be positioned over a recess within a float, such that the recess channels water into the vessel.

In an embodiment, the second end of the actuation lever may be biased toward the vessel. When the second end of the actuation lever is retracted away from the vessel when the flush handle is actuated, this causes egress of water from the vessel. The water may be expelled from the vessel either by unsealing an opening within the vessel or by via the open top of the vessel. Specifically, in one embodiment, the second end of the actuation lever is mechanically connected to a piston disposed within the vessel. The piston is not mechanically connected to the float. Instead, when the second end of the actuation lever is retracted away from the vessel, the piston is displaced within the vessel thereby expelling water via the open top of the vessel, which reduces the water level within the vessel and causes the float to transition into the descended position.

In another embodiment, the second end of the actuation lever is connected to the float via a second mechanical connector. When the second end of the actuation lever is retracted away from the vessel the second mechanical connector pulls the float into the descendent position.

In yet another embodiment, the vessel contains a drain opening, and a seal configured to seal the drain opening is affixed to the second end of the actuation lever. Thus, when the second end of the actuation lever is retracted away from the vessel, the drain opening becomes unsealed, and the water drains from the vessel under the influence of gravity.

DESCRIPTION OF THE PREFERRED EMBODIMENT

With reference to the drawings, the water flow shutoff system will now be described with regard for the best mode and the preferred embodiment. In general, the device is a system to control and stop water flow in a toilet in the event of catastrophic failure or mechanical malfunction of the flushing mechanisms. The embodiments disclosed herein are meant for illustration and not limitation of the invention. An ordinary practitioner will appreciate that it is possible to create many variations of the following embodiments without undue experimentation.

Figure 1:
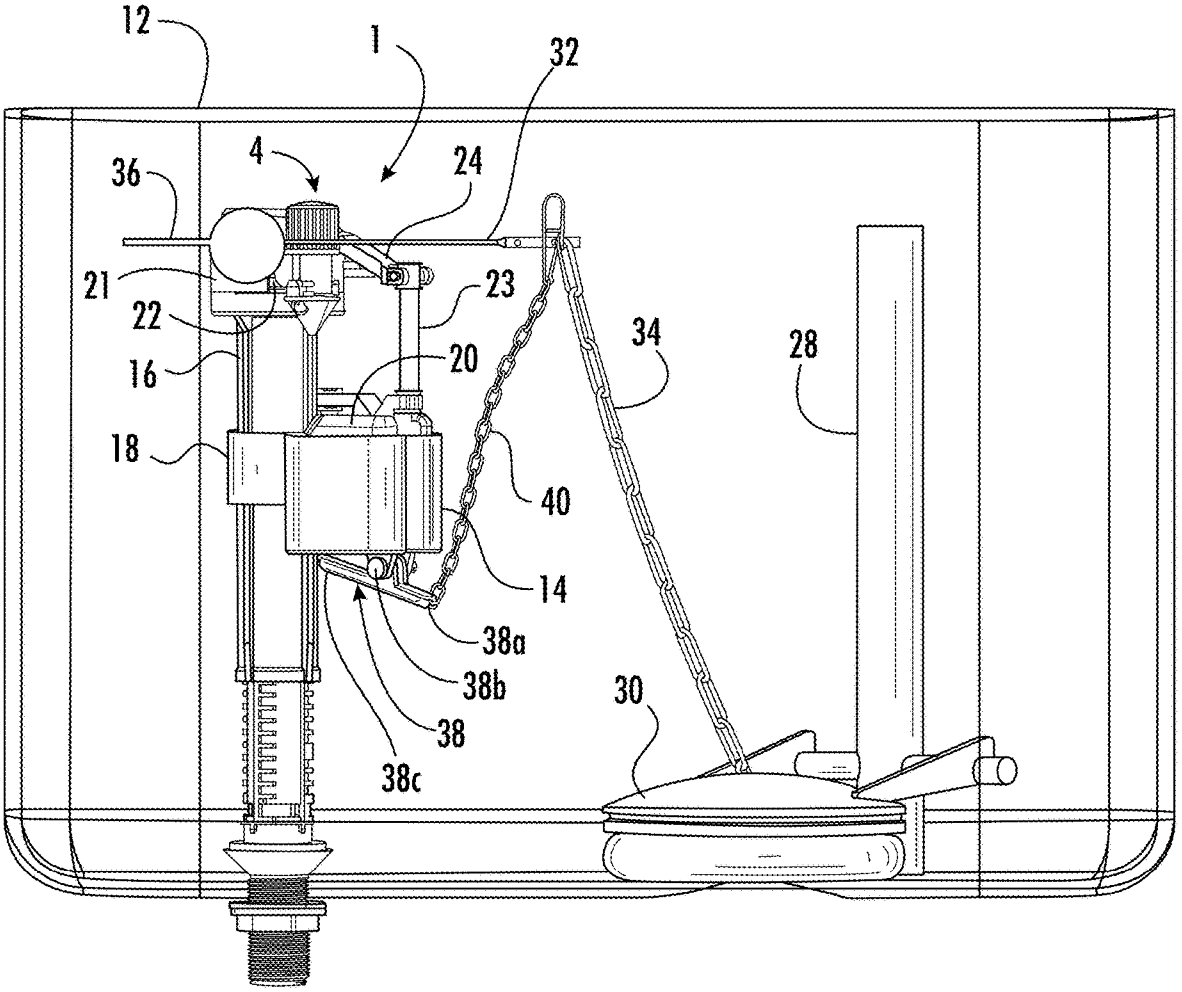
FIG. 1 shows a perspective view of an embodiment of the water flow shutoff system installed within a toilet tank.

Referring to FIG. 1, the water flow shutoff system comprises an improved water control assembly 1 for the prevention of leaks from the main tank 12 of a toilet and may optionally comprise an auxiliary water shutoff mechanism 4.

The water flow control assembly 1 is located inside the main tank 12 of a toilet and comprises a vessel 14. The vessel 14 may be affixed to a standpipe 16 by a bracket 18 or other suitable attachment. In an embodiment, bracket 18 may be an integral component of the vessel 14 configured to snap onto the standpipe 16.

The top of the vessel 14 is open to the main tank 12, while the bottom and the sidewalls of the vessel 14 enclose its inner volume, isolating it from the main tank 12. In this manner, the vessel 14 is configured to fill with water from the main tank 12 only after the water level in the main tank 12 rises to a height exceeding the height of the rim of the vessel 14, at which point the water within the main tank 12 overflows into the vessel 14, filling its interior volume.

A float 20 is disposed within the vessel 14 and is configured to translate vertically relative to the vessel 14 based on the water level therein. A rod 23 extends from the float 20 and is mechanically connected to a pivoting arm 24, which controls a fill valve 22 concealed underneath a cap 21. When the vessel 14 is filled with water, the float 20 is in its raised position, in which the rod 23 raises the arm 24, which closes the fill valve 22, stopping the water flow from the standpipe 16.

When the water level within the vessel 14 falls below a predefined height, the float 20 lowers into its descended position, in which the rod 23 pulls down the arm 24, thereby opening the fill valve 22 to refill the main tank 12. The float 20 will remain in its descended position until the water within the main tank 12 rises to a height exceeding the height of the rim of the vessel 14. At that point, the water from the main tank 12 overflows into the vessel 14 filling its interior volume and thereby causing the float 20 to ascend to its raised position. When the float 20 transitions into its raised position, the rod 23 raises the arm 24, thereby closing the fill valve 22 and shutting off the water flow from the standpipe 16 into the main tank 12.

As explained above, the water level within the vessel 14 is separate from the water level within the main tank 12. Therefore, the float 20 will remain in the raised position for as long as the vessel 14 remains substantially filled with water, irrespective of whether the water level within the main tank 12 decreases. Thus, even if the main tank 12 develops a leak, the float 20 will remain in the raised configuration within the vessel 14, maintaining the fill valve 22 in the closed state. In this manner, the flow control assembly 1 limits the extent of a leak to the volume of water corresponding to a single flush contained within the main tank 12.

FIG. 1 further depicts that the toilet tank 12 contains an overflow pipe 28 and a flapper valve 30 pivotally connected thereto. The flapper valve 30 is connected to a flush lever 32 via flush chain 34. The flush lever 32 is coupled to a flush handle 36, which is rotationally affixed to the toilet tank 12.

To prevent entanglement of the flush chain, the flow control assembly 1 utilizes an actuation lever 38, which is connected to the flush lever 32 via a dedicated mechanical attachment 40. The actuation lever 38 may be pivotally affixed to the bottom of the vessel 14. The actuation lever 38 has a proximal end 38*a*, a fulcrum 38*b*, and a distal end 38*c*. The lever is biased toward a default position depicted in FIG. 1, in which the distal end 38*c* is pivoted toward the vessel 14, while the proximal end 38*a* is pivoted away from it.

Because the proximal end 38*a* of the actuation lever 38 is connected to the flush lever 32 via a mechanical attachment 40, manual actuation of the flush handle 36 causes the distal end 38*c* of the actuation lever 38 to pivot away from the vessel 14. This pivoting action causes the float 20 to descend into its lowered position, thereby opening the fill valve 22 to refill the toilet tank 12 with water following a flush.

The present specification discloses multiple embodiments describing different ways in which retracting the distal end 38*c* of the actuation lever 38 from the vessel can cause the float 20 to transition from the raised position to the descended position, thereby initiating the water refill cycle after a flush. The specification also describes an auxiliary water shutoff mechanism 4, which provides a redundant means of filling the vessel 14 with water, irrespective of the fill level of the toilet tank 12, thereby ensuring that the fill valve 22 will close after a predetermined duration, even if the main tank 12 fails to refill due to a leak or a rupture.

Mechanically Displaceable Float

Figure 2A:
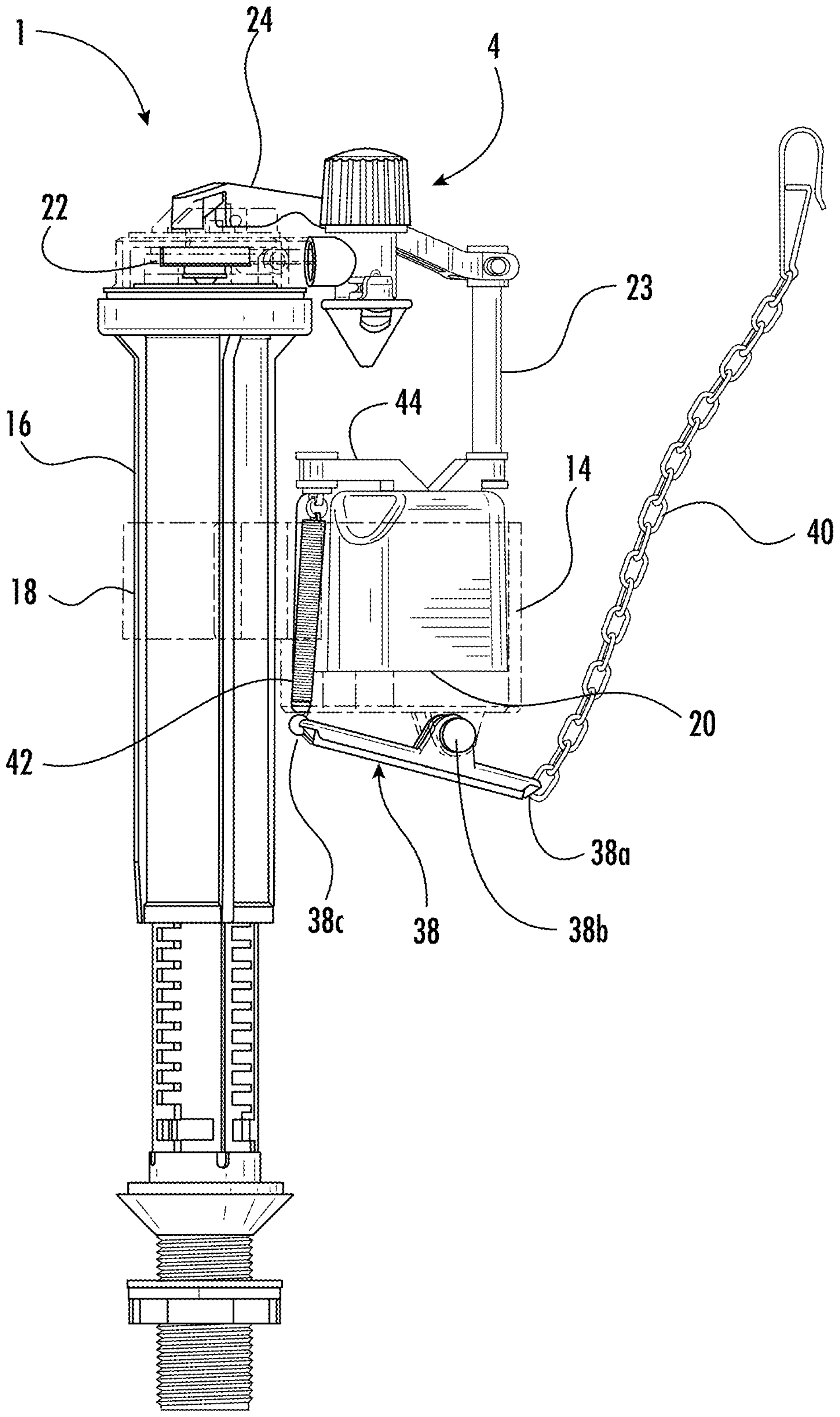
FIG. 2A is a perspective side view of the embodiment of the water flow shutoff system depicted in FIG. 1.
Figure 2B:
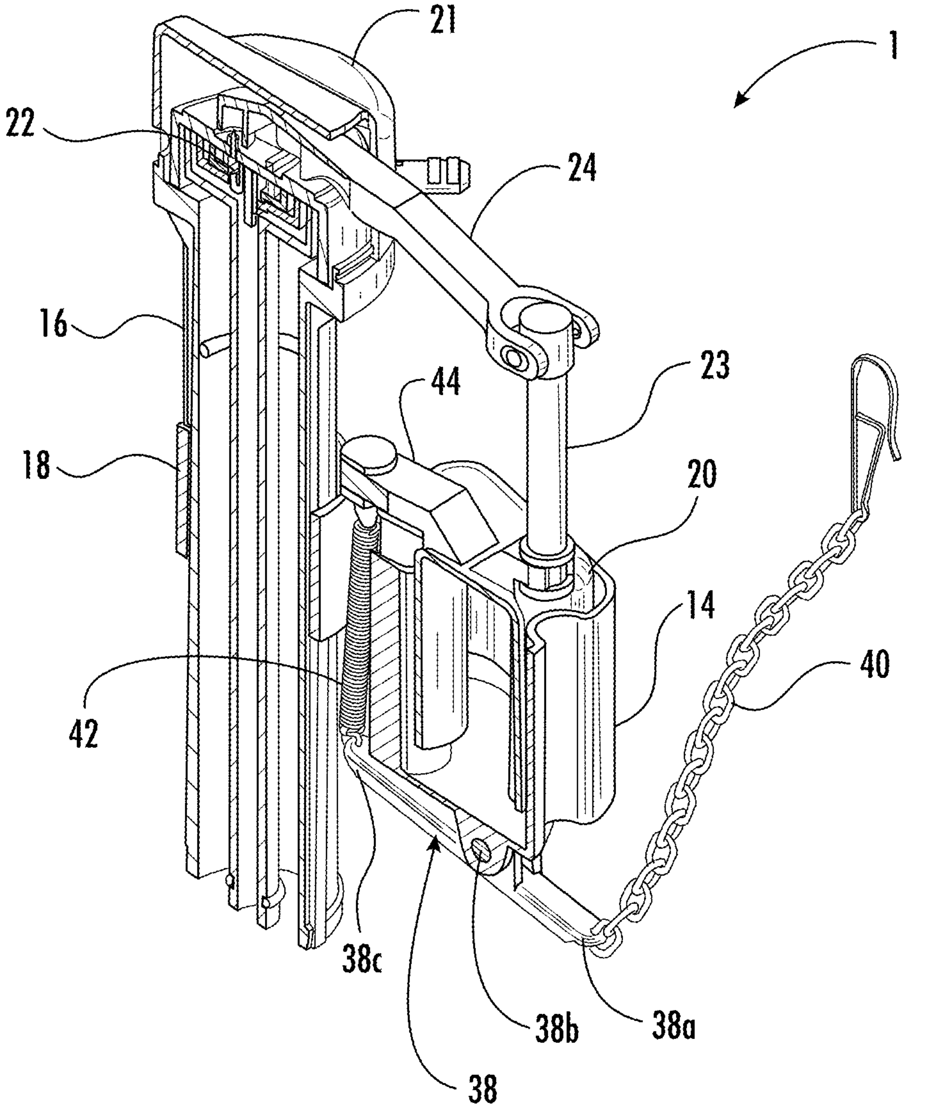
FIG. 2B is a perspective cross-sectional view of the embodiment of the water flow shutoff system depicted in FIGS. 1 and 2A.

FIGS. 1-2B depict an embodiment in which the float 20 is mechanically connected to an actuation lever 38 via a mechanical tie 42. In an embodiment, the mechanical tie 42 may be a helical extension spring configured to bias the actuation lever 38 toward its default configuration, in which the distal end 38*c* of the lever 38 is pivoted toward the vessel 14. Specifically, when the float 20 is pulled down into its descended position, the bottom surface of the float 20 abuts the bottom of the vessel 14, causing the spring 42 to stretch beyond its default length. When the flush handle is release, the spring 42 returns the distal end 38*c* of the lever 38 into its default position depicted in FIGS. 1-2B.

After a normal flush/refill cycle, the water levels in the toilet tank 12 and the vessel 14 are substantially at the same height, which coincides with the height of the rim of the vessel 14. The buoyancy force exerted onto the float 20 by the water contained within the vessel 14 retains the float 20 in the raised position, and therefore the arm 24 retains the fill valve 22 in a closed configuration, irrespective of whether the water level within the main tank 12 subsequently decreases due to a leak.

To flush the toilet, a user manually actuates the flush handle 36, which raises the flush lever 32. As the flush lever 32 pivots upward, it simultaneously applies tension to the flush chain 34 and the mechanical attachment 40. The tension in the flush chain 34 opens the flapper valve 30, thereby causing the water in the main tank 12 to flow into the toilet bowl, while the tension in mechanical attachment 16 imparts an upward force on the proximal end 38*a* of the actuation lever 38, causing it to rotate about the fulcrum 38*b*.

As the proximal end 38*a* of the actuation lever 38 moves toward the vessel 14, the distal end 38*c* retracts away from it, applying a tension force onto the mechanical tie 21. This tension force in the mechanical tie 21 pulls down the float 20 against the buoyancy force of the water contained within the vessel 14. As the float 20 translates into the descended position, the rod 23 pulls down the arm 24, thereby opening the fill valve 22, enabling the water from the standpipe 16 to refill the tank 12 for the next flush.

At the same time, the downward movement of the float 20 displaces the water from the vessel 14. The displaced water overflows the vessel 14 and spills into the tank 12, thereby reducing the amount of water remaining within the vessel 14. Accordingly, when the user releases the flush handle 36, the float 20 will remain in its descended position due to the decreased water level within the vessel 14. Accordingly, the fill valve 22 will remain open until the water level in the main tank 12 reaches the rim of the vessel 14 and overflows thereinto. At that point, the float 20 will return into its raised position, raising the arm 24 and closing the fill valve 22.

The buoyancy force of the water within the vessel 14 retains the float 20 in the raised position until the next flush/refill cycle, even if the water leaks out from the tank 12. In this manner, the flow control assembly 1 ensures that the fill valve 22 will remained closed until the next manual actuation of the flush handle 36, and therefore limits the amount of water that could potentially be lost due to a leak to the volume corresponding to a single flush contained within the tank 12.

Piston-Actuated Float

Figure 3A:
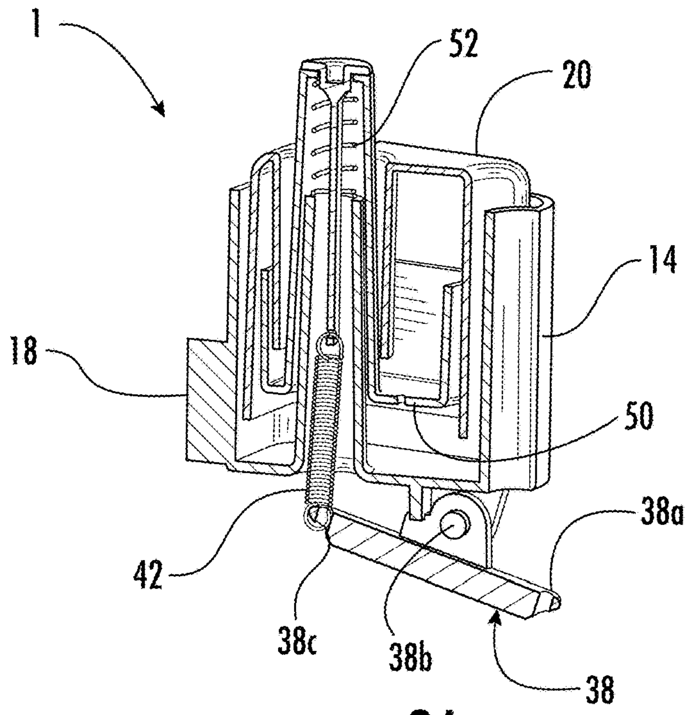
FIG. 3A is a perspective cross-section view of another embodiment of the water flow shutoff system comprising a piston.
Figure 3B:
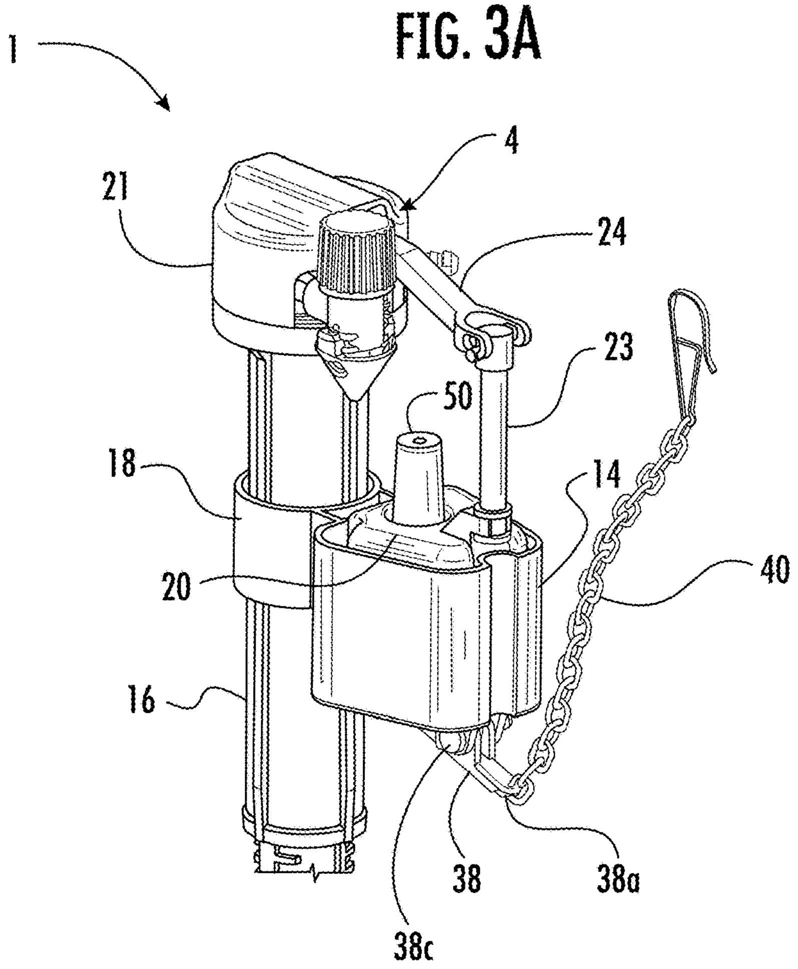
FIG. 3B is a perspective view of the embodiment of the water flow shutoff system depicted in FIG. 3A.
Figure 4:
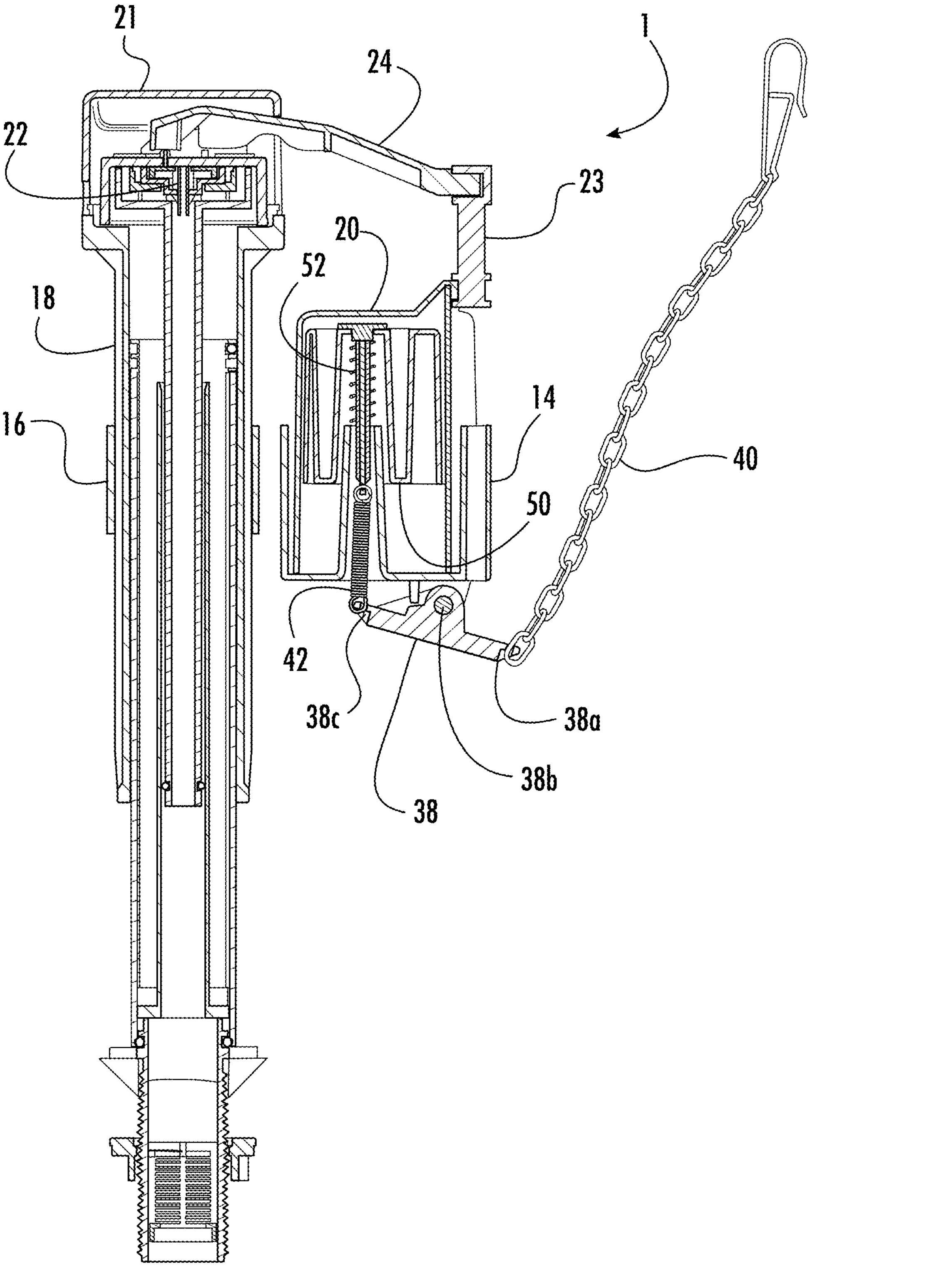
FIG. 4 is a cross-sectional side view of a variant of the embodiment of the water flow shutoff system depicted in FIGS. 3A and 3B, with the piston being encapsulated within a float.

In the embodiment depicted in FIGS. 3A-4, the flow control assembly 1 comprises a piston 50 disposed within the vessel 14. The piston 50 is mechanically coupled to the distal end 38*c* of the actuation lever 38 via the mechanical tie 42. A compression spring 52 is disposed between the piston 50 and the vessel 14 and exerts an upward biasing force on the piston 50. FIGS. 3A-4 depict that the piston 50 may be nested within the float 20, but these two structures are not mechanically connected to one another.

FIGS. 3A-3B depict an embodiment in which the piston 50 partially protrudes from the float 20, while FIG. 4 depicts an embodiment in which the piston 50 is fully encapsulated within the float 20. Both embodiments operate under substantially the same principle of operation.

In this embodiment, when the user actuates the flush handle 36, the tension in the mechanical attachment 40 pivots the actuation lever 38 in the same manner described above with respect to the embodiment depicted in FIGS. 1-2B. However, in the embodiment depicted in FIGS. 3A-4, the distal end 38*c* of the actuation lever 38 is mechanically connected to the piston 50, rather than the float 20. Accordingly, there is not mechanical connection between the flush handle 36 and the fill valve 22.

Instead, actuation of the flush handle 36 displaces the piston 50 within the vessel 20 without translating any mechanical force to the float 10. As the tension in the mechanical tie 42 pulls down the piston 50 within the vessel 14 against the biasing force of the compression spring 52, the piston 50 displaces water from the vessel 14 causing it to overflow the rim of the vessel 14 and spill into the tank 12 (at this point, the water level in the tank 12 is lower than the water level within the vessel 14 due to the flush). When the flush handle 36 is released, the compression spring 52 returns the piston 50 to its original position, causing the water level within the vessel 14 to drop since an amount of water was expelled from the vessel 14 by the piston 50. The decreased water level within the vessel 14 causes the float 20 to descend into its descended position, thereby pulling down the arm 24 and opening the fill valve 22.

Analogously to the embodiment described above with respect to FIGS. 1-2B, the float 20 will remain in its descended position until the water level in the tank 12 rises and overflows into the vessel 14. At that point, the buoyancy force of the water within the vessel 14 will raise the float 20 into its raised position, thereby raising the arm 24 and closing the fill valve 22. The float 20 will remain in the raised position, until the next actuation of the flush handle 36 due to the buoyancy force of the water retained within the vessel 14, irrespective of the water level within the tank 12.

Drainable Vessel

Figure 5:
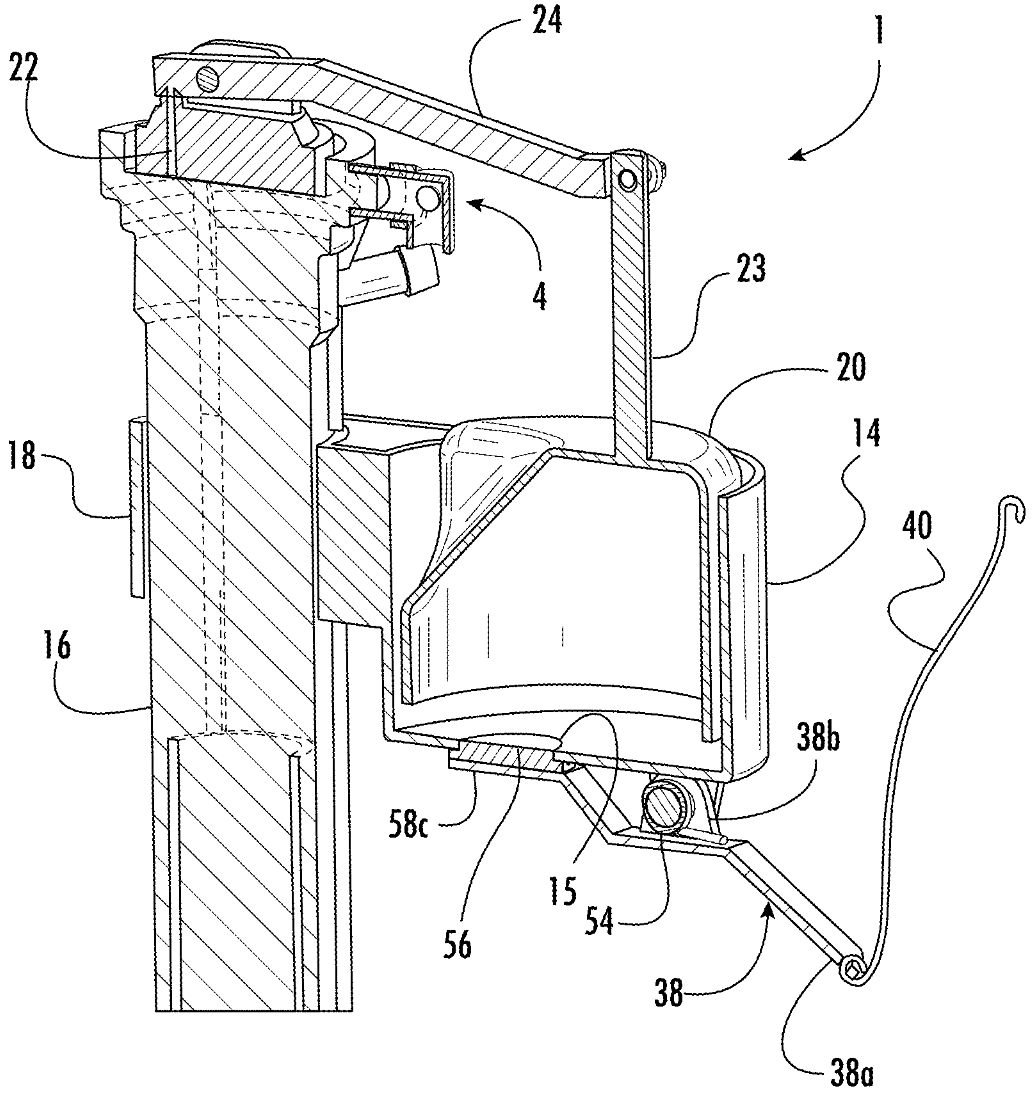
FIG. 5 is a perspective cross-sectional view of another embodiment of the water flow shutoff system in which the vessel contains a sealable drain opening.

Analogously to the embodiment depicted in FIGS. 3A-4 described above, in the embodiment depicted in FIG. 5, the actuation lever 38 is not mechanically connected to the float 20. Instead, the vessel 14 has a drain opening 15, which is selectively sealed and unsealed by a seal 56, which is affixed to the distal end 38*c* of the actuation lever 38. In this embodiment, a torsion spring 54 is disposed at the fulcrum 38*b* of the actual lever 38. The torsion spring 54 biases the distal end 38*c* of the actuation lever 38 into its default position in which the seal 56 seals the drain opening 15.

Analogously to the embodiments described above, the float 20 is disposed within the vessel 14, such that the buoyancy force exerted onto the float 20 by the water contained within the vessel 14 retains the float 20 in the raised position until the flush handle 36 is actuated. When a user manually actuates the flush handle 36, the flapper valve 30 opens, causing the water contained within the tank 12 to flow into the toilet bowl, thereby quickly decreasing the water level within the tank 12. Simultaneously, actuation of the flush handle 36 also applies an upward force to the mechanical attachment 40, which imparts an upward force on the proximal end 38*a* of the actuation lever 38, causing it to rotate about the fulcrum 38*b* against the biasing force of the torsion spring 54. As the distal end 38*c* of the actuation lever 38 retracts away from the vessel 14, the seal 56 opens the drain opening 15 in the vessel 14, thereby enabling egress of water therefrom. The water from the vessel 14 exits through the drain opening 15 under the influence of gravity and drains into the tank 12.

As the water level in the vessel 14 decreases, the float 20 descends into its descended position, thereby lowering the arm 24 and opening the fill valve 22. When the user releases the flush handle 36, the torsion spring 54 returns the actuation lever 38 to its original position, causing the distal end 38*c* of the actuation lever 38 to press the seal 56 against the drain opening 15, thereby preventing egress of the water from the vessel 14.

The fill valve 22 remains open until the water level within the tank 12 reaches the height that coincides with the rim of the vessel 14. At that point, the water from the tank 12 overflows into the vessel 14. As the vessel 14 fills with water, the buoyancy force exerted onto the float 20 by the rising water transitions the float 20 into its raised position, thereby closing the fill valve 22. The float 20 will remain in the raised position until the next time the user manually actuates the flush handle 36. Because the float 20 is controlled by the water level within the vessel 14, as opposed to the water level within the tank 12, the float 20 will remain in the raised position even if the water level within the tank 12 drops due to a leak, tank rupture, or another failure. In this manner, the flow control assembly 1 ensures that the maximum amount of water loss due to a leak or a rupture of the tank 12 is limited to the volume of water corresponding to a single flush.

Auxiliary Water Shutoff Mechanism

Figure 6A:
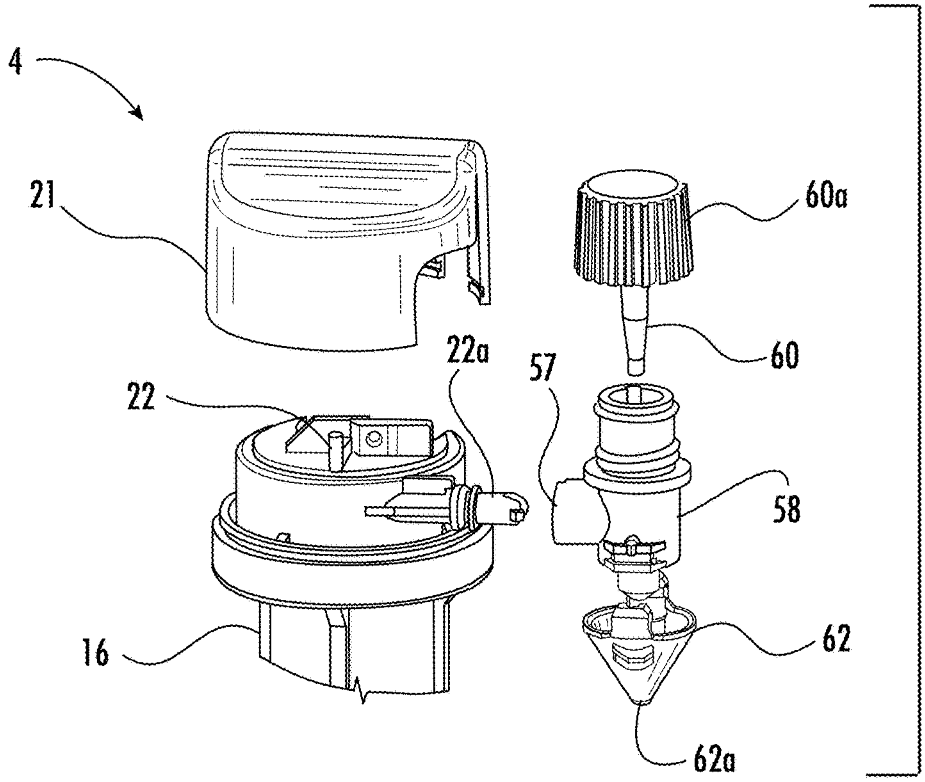
FIG. 6A is an exploded perspective view of an auxiliary water shutoff mechanism.
Figure 6B:
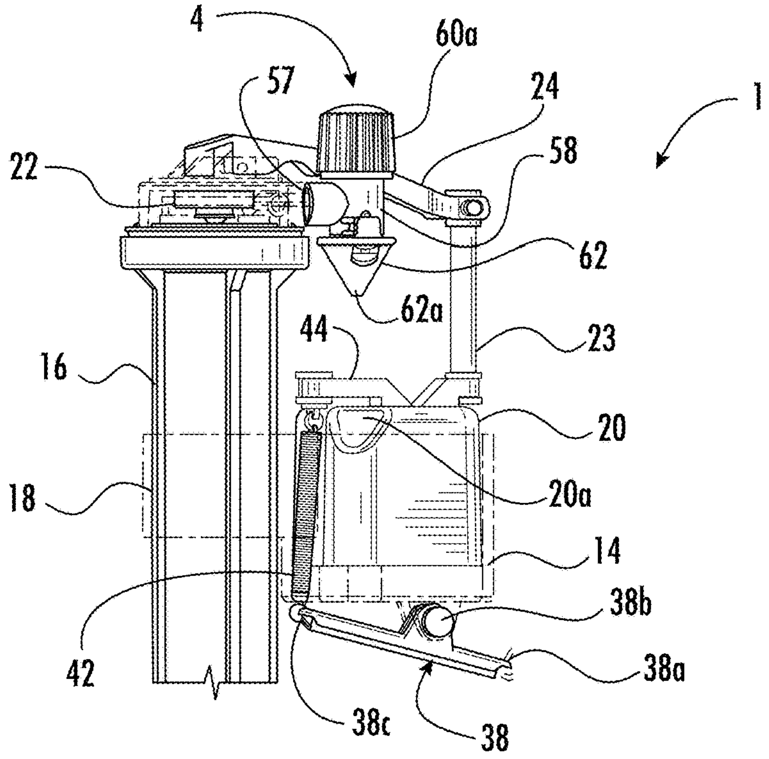
FIG. 6B is a perspective view depicting the auxiliary water shutoff mechanism depicted in FIG. 6A deployed with the water flow shutoff system depicted in FIGS. 1-2B.

The flow control assembly 1 may also include an auxiliary water shutoff mechanism 4, most clearly depicted in FIGS. 6A-6B. The auxiliary water shutoff mechanism 4 comprises an inlet 57, a flow chamber 58, a stem valve 60, and a drip funnel 62. When the fill valve 22 is open during the refill cycle, a portion of the water flowing from the standpipe 16 is directed by a conduit 22*a* to the inlet 57. A stem valve 60 is disposed within the flow chamber 58 and controls the flow rate of the water from the flow chamber 58 to the drip funnel 62. This flow rate may be adjusted via operation of the turnable knob 60*a* of the stem valve 60.

The drip funnel 62 has an opening 62*a*, which is positioned over a recess 20*a* in the float 20. The lowest part of the recess 20*a* is located below the rim of the vessel 14, and therefore recess 20*a* channels the water into the vessel 14. As the water from the drip funnel 62 fills the vessel 14, the float 20 rises due to the buoyancy force exerted thereon by the water collected within the vessel 14. When the float 20 reaches its fully raised position, the rod 23 raises the arm 24, thereby closing the fill valve 22. In this manner, the auxiliary water shutoff mechanism 4 provides a redundant means of filling the vessel 14, thereby ensuring that the flow control assembly 1 will close the fill valve 22 even if the toilet tank 12 fails to fill properly—i.e., the water level in the toilet tank 12 does not reach the rim of the vessel 14 during a predetermined time interval.

As explained above, the stem valve 60 can be operated via the knob 60*a* to selectively increase or decrease the flow rate of the water into the drip funnel 62, thereby shortening or extending the time interval required for the auxiliary water shutoff mechanism 4 to fill the vessel 14. This time interval defines the maximum duration during which the fill valve 22 may remain continuously open. To ensure that the auxiliary water shutoff mechanism 4 does not interfere with the normal refill cycle, the stem valve 60 is preferably set to a setting at which the duration of time required for the auxiliary water shutoff mechanism 4 to fill the vessel 14 corresponds to (or slightly exceeds) the amount of time required for fill valve 22 to refill the tank 12 during a normal operation of the toilet. In this manner, the water shutoff mechanism 4 effectively functions as an adjustable safety timer that will automatically close the fill valve 22 after a predetermined duration, even if the water level in the main tank 12 remains below the rim of the vessel 14.

In this manner, if the toilet fill system functions properly, the water entering the main tank 12 from the standpipe 16 will reach the rim of the vessel 14 before the auxiliary water shutoff mechanism 4 fills the vessel 14 with the water from the drip funnel 62*a*. At that point, the water from the tank 12 will overflow into the vessel 14, thereby raising the float 20 and closing the fill valve 22. When this happens, the water remaining in the drip funnel 62 will simply drain into the tank 12 under the influence of gravity, thereby effectively resetting the "fill timer" of the auxiliary water shut of mechanism 4 for the next flush/refill cycle.

However, in the event there is a leak in the main tank 12 which precludes the water level in the tank 12 from reaching the rim of the vessel 14 during a predetermined time interval, then the vessel 14 will become filled with the water deposited thereinto from the drip funnel 62, rather than the rising water within the main tank 12. Thus, the auxiliary water shutoff mechanism 4 provides a redundant means of refilling the vessel 14, thereby limiting the maximum duration during which the fill valve 22 may stay open continuously, thereby eliminating excessive water waste and preventing flooding, even if the main toilet tank 12 suffers a catastrophic failure—for example, a rapture.

The foregoing embodiments are merely representative of the water flow shutoff system and not meant for limitation of the invention. For example, persons skilled in the art would readily appreciate that there are several embodiments and configurations of floats and containers that will not substantially alter the nature of the water flow shutoff system. Consequently, it is understood that equivalents and substitutions for certain elements and components set forth above are part of the invention described herein and set forth in the claims below.

The invention claimed is:

1. A toilet water flow shutoff apparatus, comprising:

a vessel configured to be mounted within a toilet tank in a stationary relationship therewith, wherein the toilet tank contains an inflow conduit having fill valve and an outflow opening selectively sealable by a flapper valve;

a float disposed within the vessel, wherein the float is configured to translate relative to the vessel between a raised position and a descended position in response to changes in the vessel's water level, and wherein the fill valve is closed when the float is in the raised position and wherein the fill valve is open when the float is in the descended position;

an actuation lever pivotally affixed to the vessel, the actuation lever having a first end and a second end, wherein the first end and the second end are disposed on opposite sides of a fulcrum and wherein the second end of the actuation lever is biased toward the vessel;

a first mechanical connector affixed to the first end of the actuation lever and configured to be connected to a toilet flush handle; and a second mechanical connector connecting the second end of the actuation lever to the float, wherein actuation of the toilet flush handle is configured to raise the flapper valve thereby unsealing the outflow opening and causing the toilet tank to flush, and wherein actuation of the toilet flush handle is also configured to apply tension onto the first mechanical connector thereby causing the actuation lever to pivot about the fulcrum thus causing the second end of the actuation lever to apply tension onto the second mechanical connector, thereby pulling the float into the descended position and thus opening the fill valve to refill the toilet tank, and wherein the float is configured to transition into the raised position upon the vessel becoming refilled with water thereby closing the fill valve, and wherein the float is configured to remain in the raised position irrespective of the toilet tank's water level.

2. The toilet water flow shutoff apparatus of claim 1, wherein the second mechanical connector is a spring.

3. The toilet water flow shutoff apparatus of claim 2, wherein in the descended position, the float abuts a bottom of the vessel causing the spring to stretch beyond its default length, thereby biasing the second end of the actuation lever toward the vessel.

4. The toilet water flow shutoff apparatus of claim 1, wherein water entering the toilet tank from the inflow conduit is partially directed into the vessel thereby creating a secondary water flow configured to refill the vessel.

5. The toilet water flow shutoff apparatus of claim 4, wherein a flow rate of the secondary water flow is adjustable.

6. The toilet water flow shutoff apparatus of claim 5, wherein the flow rate of the secondary water flow is controlled by an adjustable stem valve.

7. The toilet water flow shutoff apparatus of claim 4, wherein the fill valve is prevented from remaining open for longer than a predetermined duration required for the secondary water flow to refill the vessel, whereby the float rises into the raised position when the vessel is refilled with water thus closing the fill valve.

8. The toilet water flow shutoff apparatus of claim 4, further comprising a funnel configured to direct the secondary water flow into the vessel.

9. The toilet water flow shutoff apparatus of claim 8, wherein the funnel is positioned over the vessel and the secondary water flow is configured to be directed from the funnel into the vessel by gravity.

10. The toilet water flow shutoff apparatus of claim 9, wherein an opening of the funnel is positioned over a recess within the float, and wherein the recess channels water into the vessel.

11. The toilet water flow shutoff apparatus of claim 1, wherein buoyancy force of water contained within the vessel retains the float in a raised position until the toilet flush handle is manually actuated, thus preventing a continuous leak between flushes.

12. A toilet water flow shutoff apparatus, comprising:

a vessel configured to be mounted within a toilet tank in a stationary relationship therewith, the vessel having an interior volume and a rim defining an open top, wherein the toilet tank contains an inflow conduit having a fill valve and an outflow opening selectively sealable by a flapper valve;

a float disposed within the vessel and operatively connected to the fill valve, wherein the fill valve is closed when the float is in a raised position and wherein the fill valve is open when the float is in a descended position, the float being configured to transition into the raised position when a water level within the vessel reaches a predefined height and configured to transition into the descended position when the water level within the vessel falls below the predefined height, an actuation lever pivotally disposed within the toilet tank, the actuation lever having a first end and a second end, wherein the first end and the second end are disposed on opposite sides of a fulcrum, wherein the second end of the actuation lever is biased toward the vessel and wherein retracting the second end of the actuation lever away from the vessel causes egress of water from the vessel; and a first mechanical connector affixed to the first end of the actuation lever and configured to connect to a toilet flush handle, wherein actuation of the toilet flush handle is configured to apply tension to the first mechanical connector causing the actuation lever to pivot about the fulcrum thereby retracting the second end of the actuation lever away from the vessel and causing egress of water from the vessel, such that the water level within the vessel falls below the predefined height, thereby transitioning the float into the descended position and opening the fill valve to refill the toilet tank, and wherein the float is configured to remain in the descended position until the vessel becomes refilled with water to the predefined height.

13. A toilet water flow shutoff apparatus of claim 12, wherein the water level within the vessel is configured to reach the predefined height in response to water within the toilet tank overflowing into the vessel via the open top thereof.

14. The toilet water flow shutoff apparatus of claim 12, wherein water entering the toilet tank from the inflow conduit is partially directed into the open top of the vessel thereby creating a secondary water flow, such that when the secondary water flow refills the vessel to the predefined height, the float transitions into the raised position and closes the fill valve.

15. The toilet water flow shutoff apparatus of claim 14, wherein a flow rate of the secondary water flow is adjustable.

16. The toilet water flow shutoff apparatus of claim 15, further comprising a stem valve for controlling the flow rate of the secondary water flow.

17. The toilet water flow shutoff apparatus of claim 14, wherein the fill valve is prevented from remaining open for longer than a predetermined duration required for the secondary water flow to refill the vessel, whereby the float rises into the raised position when the vessel is refilled to the predefined height thus closing the fill valve.

18. The toilet water flow shutoff apparatus of claim 14, further comprising a funnel configured to direct the secondary water flow into the vessel.

19. The toilet water flow shutoff apparatus of claim 18, wherein the funnel is positioned above the vessel and the secondary water flow is configured to be directed from the funnel into the vessel by gravity.

20. The toilet water flow shutoff apparatus of claim 19, wherein an opening of the funnel is positioned over a recess within the float, and wherein the recess channels water into the vessel.

21. The toilet water flow shutoff apparatus of claim 12, wherein water within the vessel maintains the float in the raised position irrespective of an amount of water remaining within the toilet tank, thereby preventing the float from opening the toilet tank fill valve until the toilet flush handle is actuated, thus preventing a continuous leak.

22. The toilet water flow shutoff apparatus of claim 12, wherein the second end of the actuation lever is mechanically connected to a piston disposed within the vessel, and wherein when the second end of the actuation lever is retracted away from the vessel, the piston is displaced within the vessel thereby expelling water via the open top of the vessel, thereby causing the float to transition into the descended position.

23. The water flow shutoff apparatus of claim 22, wherein the piston is not mechanically connected to the float.

24. The toilet water flow shutoff apparatus of claim 12, wherein the second end of the actuation lever is connected to the float via a second mechanical connector, and wherein when the second end of the actuation lever is retracted away from the vessel the second mechanical connector pulls the float into the descended position.

25. The toilet water flow shutoff apparatus of claim 12, wherein the vessel contains a drain opening, and the second end of the actuation lever operates a seal configured to form a sealing engagement with the drain opening.

* * * * *